United States Patent [19]

Berger et al.

[11] Patent Number: 4,598,503

[45] Date of Patent: Jul. 8, 1986

[54] VIBRATION ABSORPTION MOUNTING FOR A ROOFTOP AIR HANDLING UNIT OR THE LIKE (II)

[76] Inventors: Richard C. Berger, Off Split Rock Rd., Syosset, N.Y. 11791; Paul L. Berger, 28 Moss La., Jericho, N.Y. 11753

[21] Appl. No.: 617,267

[22] Filed: Jun. 4, 1984

[51] Int. Cl.[4] .................. F16M 9/00; E02D 27/44; E04B 1/36
[52] U.S. Cl. .................................. 52/27; 52/167; 248/544; 248/561; 248/624
[58] Field of Search ............... 248/561, 563, 624, 544; 52/167, 27

[56] References Cited

U.S. PATENT DOCUMENTS

| | | | |
|---|---|---|---|
| 1,763,682 | 6/1930 | Wallace | 248/624 |
| 1,880,280 | 10/1932 | Replogle | 248/563 |
| 2,064,751 | 12/1936 | Hussman | 248/544 |
| 2,173,342 | 9/1939 | Rosenzweig | 248/624 |
| 2,174,209 | 9/1939 | Genest et al. | 248/561 |
| 2,315,398 | 3/1943 | Clark | 248/561 |
| 2,979,297 | 4/1961 | Suozzo | 248/544 |
| 3,878,655 | 4/1975 | Toth et al. | 52/27 |
| 4,069,992 | 1/1978 | Lada | 248/544 |
| 4,513,939 | 4/1985 | Berger et al. | 248/561 |

Primary Examiner—Carl D. Friedman
Assistant Examiner—Michael Safavi
Attorney, Agent, or Firm—Bauer & Amer

[57] ABSTRACT

An improved arrangement of so-called upper and lower curbs with interposed springs having an interconnected condition allowing for their delivery to an installation site as a single modular section, and at said site each section bolted together and then readily released from each other to then allow vibratory movement in said upper curb relative to said lower curb on said interposed springs, and wherein the release is produced by the force urgency in the springs which dampen the vibration of the air handling unit which is mounted on the curbs.

4 Claims, 6 Drawing Figures

VIBRATION ABSORPTION MOUNTING FOR A ROOFTOP AIR HANDLING UNIT OR THE LIKE (II)

The present invention relates generally to a vibration absorption system of the type described and illustrated in U.S. Pat. No. 3,878,655, wherein there is dampening of the vibration of a rooftop mounted heating and air-conditioning unit, and more particularly to improvements in such a system which significantly facilitates the installation and weather-proofing thereof.

As generally understood from the patent literature, and as exemplified by U.S. Pat. No. 3,878,655, so-called upper and lower curbs, with springs in interposed positions therebetween, are used to complete rooftop mountings of large heating and air-conditioning units wherein vibration occasioned by the operation of the compressor of the unit is absorbed by the springs and thus does not dislodge or otherwise adversely effect the firmness of the attachment of the so-called lower curb to the rooftop, the unit being mounted on said upper curb and thus being supported on said interposed springs. In this manner, the upper curb with its load is free to move in vibratory movement relative to the stationary lower curb during operation of the air handling unit. However, before the installation of the unit on said curbs, it would be preferable if the upper and lower curbs were able to be handled as a single modular section when delivered to the rooftop site, and at said site be bolted together preparatory to the application to same of weather-proofing materials. Undoubtedly because in use the curbs must be separated, they are also supplied separately to the rooftop site for attachment to the air handling unit and roof respectively, and also in said separated condition are rendered weather-proof, even though this adds to the installation cost and difficulty in achieving the proper mounting for the air handling unit.

Broadly, it is an object of the present invention to provide an improved vibration absorption mounting for a rooftop air handling unit overcoming the foregoing and other shortcomings of the prior art. More particularly, it is an object to provide the mounting curbs as complete sections in an initial interconnected condition, and to use the vibration-dampening springs to effectuate their release from each other, so that the load-supporting upper curb is free to bibrate, as it must during operation of the air handling unit, relative to the stationarily mounted lower curb.

A further object is to so embody the vibration-dampening springs in their interposed position between the upper and lower curbs so that their replacement is readily accomplished, which replacement may be required because of normal wear and abuse, or in order to permit varying the force urgency and thus the vibratory force that supports the air handling unit mounted on the upper curb.

An improved pre-assembled vibration absorption system for a rooftop mounted air handling unit, such as an air conditioner, a blower, or other vibration generating equipment, which demonstrates objects and advantages of the present invention includes at least one lower curb having a laterally extending panel adjacent an upper end thereof and having edges in said panel which cooperate to bound at least one opening of a selected size therein. A cooperating upper curb having an operative position in supporting relation on the lower curb has a threaded bolt attached to extend in depending relation therefrom through the lower curb opening and has a bolt head on the lower end thereof. In the length portion between the bolt head and the lower curb opening is an oversized nut-like operative member which in practice is adapted to be adjustable from a position adjacent the bolt head up along the bolt into engaged relation with the edges bounding lower curb opening to thereby cause the bolting of the upper and lower curbs together to facilitate the handling thereof in shipment to a rooftop site. Completing the system is a compressible spring-actuated lifting device having an operative position located beneath the bolt head and adapted to partake of ascending movement upon the loading of the compressible spring. As a result, upon the threadable adjustment of the nut-like operative member down along the bolt causing the unbolting of the upper curb from the lower curb, and the loading of the compressible spring causing ascending movement in the lifting device, there is established contact of the lifting device with the bolt head and a corresponding ascending movement in the upper curb relative to the lower curb. This separation of the curbs allows for vibratory movement of the upper curb relative to the lower curb to the extent permitted by the compressible spring of the lifting device.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein.

Figure 1:
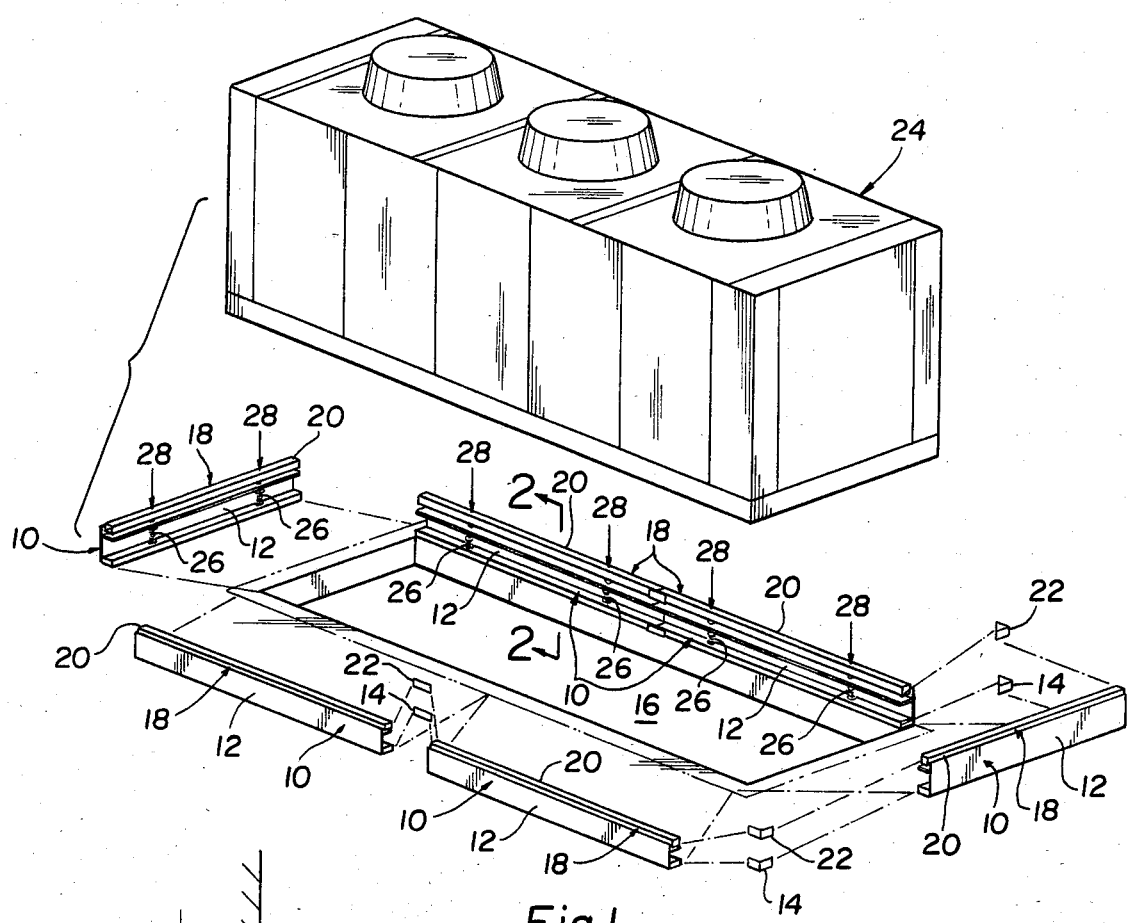
FIG. 1 is an exploded overall isometric view of an improved vibration absorption mounting for a rooftop air handling unit, or the like, according to the present invention.
Figure 4:
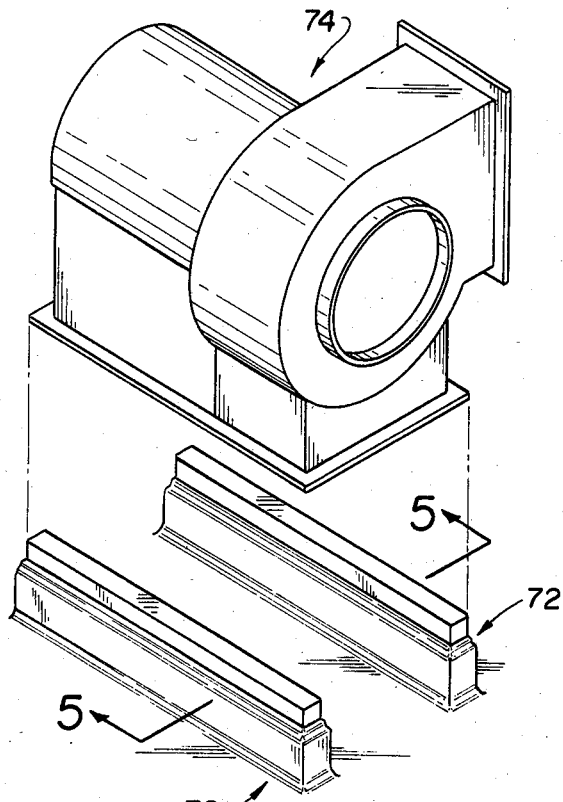
Figures 5A, 5B:
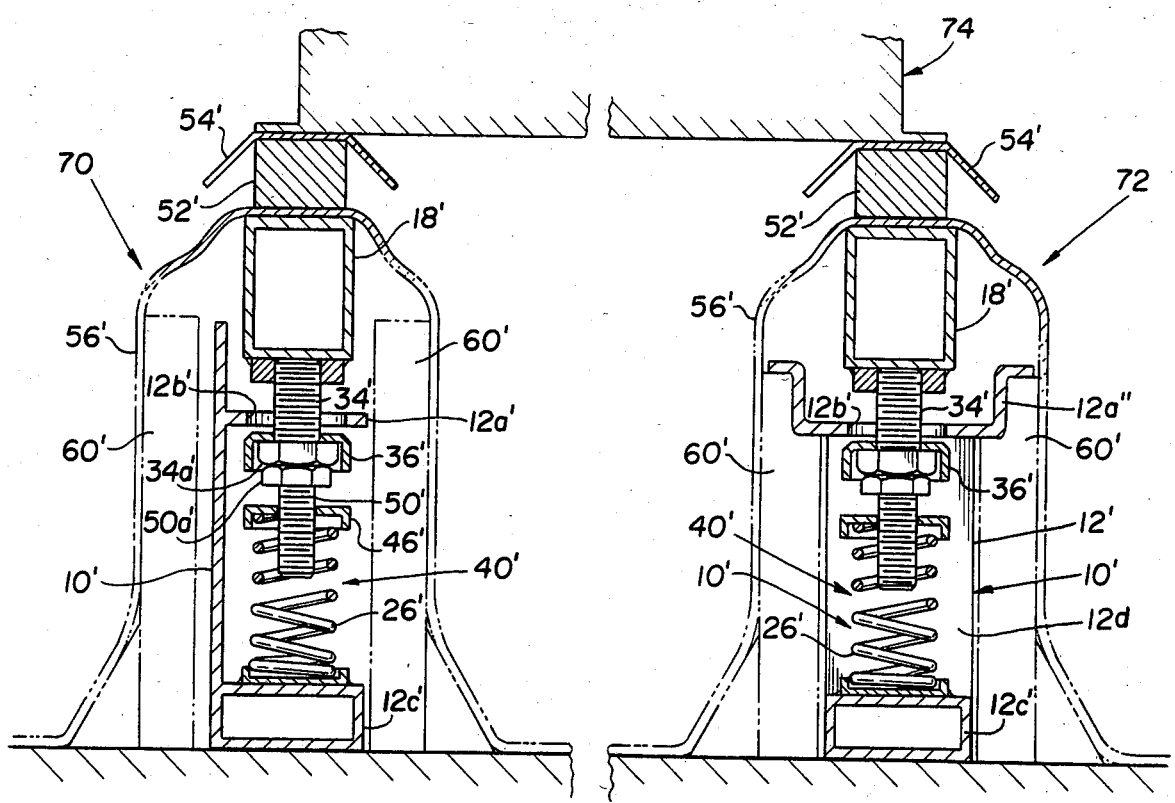

FIG. 4 is an isometric exploded view, similar to FIG. 1, but illustrating the use of only two supporting mounting units in a parallel relationship to each other for an air handling unit in the specific form of a blower; and FIGS. 5A and 5B are side elevational views, both taken in section along lines 5—5 of FIG. 4, but illustrating, respectively, first and second embodiments for mounting the upper curb for vibratory movement in relation to the lower curb.

The rooftop mounting to be described in detail herein is of the general classification illustrated and described in the patent literature, as for example, in U.S. Pat. No. 3,878,655, which is incorporated herein by reference in its entirety. For office buildings, it is conventional to mount air handling units, such as heating and air-conditioning units, on the rooftop using a cooperating pair of so-called upper and lower curbs. Typically, the lower curb, generally designated 10 in FIG. 1, consists of six rails 12 joined to each other in any appropriate manner, as by brackets 14, so as to form a rectangular shape as illustrated, which structure is then stationarily mounted to the rooftop and bounds an internal rectangular opening 16 through which are passed the conduits and ducts which must be attached to the air handling units.

Figure 2:
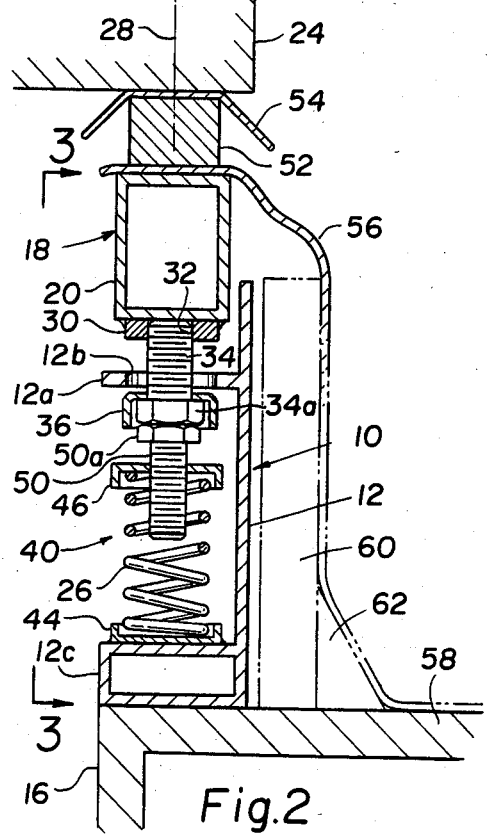
FIG. 2 is a side elevational view, in section taken along lines 2—2 of FIG. 1, illustrating structural details of the mounting when the upper curb is free to move in vibratory movement relative to the lower curb.

Cooperating with the lower curb 10 is an upper curb, generally designated 18 in FIG. 1, which similarly is formed into a rectangular shape by rails 20 appropriately connected to each other also by intermediate and corner brackets 22. When an air handling unit, such as unit 24 shown in FIGS. 1 and 2, is appropriately mounted on the upper curb 18, it is necessary that the upper curb 18 have a degree of movement relative to the stationarily mounted lower curb 10 so that the vibration produced during the operation of the air handling unit 24, by its compressor or the like, does not result in a breakdown of the stationary mounting that has been provided to the lower curb 10. Stated another way, the vibration which is produced during the operation of the air handling unit 24 and transmitted to the upper curb 18 must not be permitted to be transmitted to the lower curb 10 and thus, in these type of rooftop installations, it is arranged that the vibration be absorbed by springs, herein individually and collectively designated 26, which are provided with an interposed position between the upper and lower curbs 18 and 10. Thus, the spring 26 illustrated in enlarged scale in FIG. 2, is typically but one of twelve, each provided between the curbs at select locations designated individually and collectively 28 in FIG. 1.

Thus far, what has been described are general aspects of a typical vibration absorbing system for a rooftop mounted heating and air-conditioning unit. The improvements according to the present invention which are applied to this system are those which permit the curbs 18 and 10 to be delivered as a complete section in a bolted together condition to the rooftop installation site, to be installed at that site as a single unit, to have the air handling unit 24 placed in surmounted relation on the upper curb 18, and to then have the two curbs released from each other to thereby bring into play the springs 26 to absorb the vibratory movement in the upper curb 18 relative to the stationarily mounted lower curb 10. This is in sharp contrast to the present prior art practice in which the lower curb 10 and upper curb 18 are delivered in an unassembled condition to the rooftop site, and the lower curb 10 is then stationarily installed in place and then the upper curb assembled thereto in superposed relation with the vibration-absorbing springs in an interposed position therebetween, and then the air handling unit placed on this assembly. At this time, the prior art also contemplates the application of weatherproofing components about the two curbs.

Figure 3:
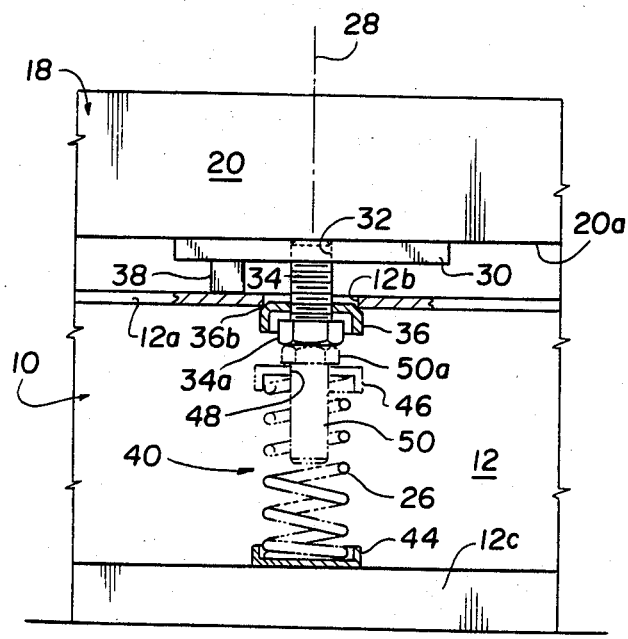
FIG. 3 is also a side elevational view of the mounting, but is taken in section along lines 3—3 of FIG. 2 and illustrates the condition thereof when the upper and lower curbs are bolted together.

The improved vibration absorption mounting of the present invention can be best understood by referring first to FIG. 3, which shows the rail 20 of an upper curb 18 and the rail 12 of a lower curb 10 in a bolted together condition which is preferred for the shipment thereof to a site, and is also the preferred condition for the raising of these curbs to the rooftop. As shown in FIG. 3, at each location 28, there is attached, by welding or the like, to the underside surface 20a of rail 20 a plate 30 having a threaded opening 32 therein. Threadably disposed in the threaded opening 32 to extend in depending relation from the rail 20 is a bolt 34 having a bolthead 34a at its lower end. More particularly, and as is perhaps best illustrated in FIG. 2 in conjunction with FIG. 3, each lower curb rail 12 has a laterally extending panel portion 12a which has an opening 12b of a selected size. Selected to be slightly larger than the opening 12b is a threadable operable member 36 which is somewhat like a nut, and is threadably disposed on the bolt 34 below the opening 12b and above the bolthead 34a. Thus, the oversized nut or member 36, when threadably adjusted up along the bolt 34 is adapted to engage the lateral extension 12a of the lower curb rail 12, as at 36b, and thus bolt together the lower curb rail 12 and upper curb rail 20 with a spacer block 38 in an interposed position therebetween.

Of significant importance and as shown in phantom perspective in FIG. 3, the present invention contemplates the use of a spring-actuated lifting device or mechanism, generally designated 40, in position beneath the bolthead 34a and in this strategic position being able to urge the upper curb 18 through ascending movement relative to the lower curb 10, when the two curbs are unbolted from each other. In showing the mechanism 40 in phantom pespective it is intended to illustrate that this mechanism is not an integral part of the lower curb 10, but is separately placed in the position illustrated, and, as a consequence, is capable of being replaced when the spring of the lifting mechanism, through normal wear and abuse, requires such replacement. The unattached nature and thus replaceability of the lifting mechanism 40 also permits varying the force urgency used to lift the upper curb and thus the vibratory force that supports the unit 24 mounted on the upper curb 18, by appropriate selection of the spring embodied in the mechanism 40.

As shown in FIG. 3, the mechanism 40 includes a selected helical spring, previously identified by the reference numeral 26, whose bottom end is seated in a cap 44, which can be either merely placed or welded in place at the station or location 28. At its opposite end, spring 26 is seated in an upper cap 46 which has a threaded central opening 48 in which there is threadably disposed a bolt 50 having a bolthead 50a in abutting relationship with the bolthead 34a of the bolt 34 of the upper curb 18. As a result, when spring 26 is loaded, or, in other words, placed under heavy compression, it is capable of urging the upper cap 46 through ascending movement and thus the bolthead 50a against the bolthead 34a.

Naturally, in the condition illustrated in FIG. 3, as long as the operable member or nut 36 maintains the two curbs 18 and 10 bolted together, any force urgency in the spring 26 will have no effect. However, the present invention contemplates unthreading the member 36 down along the bolt 34 so that there is disengagement at the locations 36b of the member 36 from the laterally extending projection 12a of the lower curb rail 12. Following this disengagement, the upper cap 46 is then threadably adjusted downwardly along the bolt 50 which, it will be readily appreciated, causes compression and thus loading of the spring 26. The loaded spring 26 is then effective in urging the upper curb 18 through ascending movement from the position illustrated in FIG. 3, which then permits removal of the spacer 38.

Reference should now be made to FIG. 2, which illustrates the manner in which the spring mechanism 40 supports a typical air-conditioning unit 24 which, in practice, is supported on the unbolted upper and lower curbs 18 and 10. Member 36, as already noted, has been threaded down along the bolt 34 into a position adjacent the bolthead 34a. Responding to the weight of the unit 24 on the upper curb 18 there is slight compression in the spring 26 of the mechanism 40 and descending movement of the member 36 below the lateral projection 12a of the lower curb 10. As a result of the removal of the spacer 38, there is of course unobstructed clearance space above the lateral projection 12a, i.e., between it and the plate 30 welded to the rail 20 of the upper curb 18. As a result, any vibratory movement up and down of the member 24, which may be caused by the operation of a compressor or like component thereof, is absorbed by the spring 26, and is therefore not transmitted to the base 12c of the rail 12 of the lower curb 10.

For completeness sake it should be noted that the resilient mounting for the unit 12, as just described, is typically rendered weatherproof and, in some instances, even soundproof, at the rooftop installation site. Thus, as is perhaps best shown in FIG. 2, the installation of the mounting typically includes an equipment support bar 52 of appropriate material, and a metal strip 54 to provide a favorable gravity flow of rain, sleet, or the like. The weatherproofing will also typically include a neoprene flexible weather strip 56 engaged at its upper end between the bar 52 and upper curb 18 and attached at its lower end to the roof surface 58. Under the weather strip 56 there may be typically provided a thermal and acoustical panel 60 and a so-called cant strip 62, which, in a well understood manner, is effective to render the installation weatherproof and weathertight.

In addition to mounting an air handling unit or the like in position about a rooftop rectangular opening, such as the opening 16 just described in connection with FIGS. 1-3, it is also contemplated using the improved inventive vibration absorption mounting hereof for a blower, or any vibration generating equipment which does not necessarily require a rooftop opening to complete a connection to conduits and the like. Such installation is shown in FIGS. 4, 5A and 5B, to which reference should now be made. As shown in FIG. 4, a spaced apart parallel arrangement of the improved vibratory absorption mounting units according to the present invention, specifically designated 70 and 72, are advantageously used for supporting a blower 74 or other vibration generating equipment. Since the construction and arrangement of the components in the unit 70 and 72 are substantially similar to that already described in connection with FIGS. 1-3, this similarity will be noted by the use of the same but primed reference numerals, and, for brevity sake, the description already provided will not be repeated. The only significant difference, as shown in FIG. 5A, is that the mounting unit 70 has weatherproofing on both sides of the superposed arrangement of the lower and upper curbs 10', 18'. In all other respects, backing off of the member 36' along the bolt 34' unbolts the two curbs from each other and then permits the loading of the spring 26' of the lifting mechanism 40' with the result that the upper curb 18' assumes a clearance position with respect to the lower curb 10' and is thus free to partake of vibratory movement relative thereto in response to any vibratory movement of the blower or fan 74.

In the slightly modified embodiment of FIG. 5B, the rail 12' of the lower curb 10' includes as part of the base 12c' an upstanding panel 12b at spaced intervals therealong which are connected to and support the modified version of the previously described lateral projection 12a, which in FIG. 5B is designated 12a" and is U-shaped in cross-section. In all other respects, the embodiment of FIG. 5B is similar to those embodiments already described. More particularly, the embodiment of FIG. 5B contemplates unthreading of the member 36' down along the bolt 34' to cause unbolting of the lower and upper curbs 10', 18'. After being unbolted, the spring 26' of the lifting mechanism 40' is then loaded, and, as already described, is effective in causing ascending movement of the upper curb 18' in relation to the lower curb 10' and thus providing the necessary clearance above and below the portion 12a" of the lower curb rail 12' to allow for vibratory movement of the upper curb 18' in relation to the lower curb 10'.

In all embodiments described herein, there is of course applied to the curbs external weatherproofing materials. Thus, it will be understood that in contemplation of replacing the lifting mechanisms 40, 40', if need be, that the external weatherproofing materials will have access openings at each spring location 28, to thereby facilitate removal and insertion through a cooperating access opening of a replacement lifting mechanism.

A latitude of modification, change and substitution is intended in the foregoing disclosure, and in some instances some features of the invention will be employed without corresponding use of other features. Accordingly, it is appropriate that the appended claims be construed broadly and in a manner consistent with the spirit and scope of the invention herein.

What is claimed is:

1. An improved pre-assembled vibration absorption system for a rooftop mounted air handling unit or the like, comprising, in combination, at least one lower curb having a laterally extending panel adjacent an upper end thereof and edges in said panel cooperating to bound at least one opening of a selected size therein, a cooperating upper curb disposed on said lower curb, said upper curb having a threaded first bolt attached to extend in depending relation therefrom through said lower curb opening and having a bolt head on the lower end thereof, an inverted U-shaped nut threadably disposed on said threaded bolt for threaded adjustment thereon in the length portion between said bolt head and said lower curb opening, said inverted U-shaped nut being oversized in relation to said lower curb opening so as to be adjustable from a position adjacent said bolt head up along said bolt into engaged relation with said edges bounding said opening to thereby cause the bolting of said upper and lower curbs together to facilitate the handling thereof in shipment to a rooftop site, and a compressible spring-actuated lifting device disposed beneath said bolt head adapted to partake of ascending movement upon the loading of such compressible spring comprised of a vertically oriented helical spring, serving as said compressible spring, a cap having a threaded opening therein in covering relation over the upper end of said spring, and a second bolt in threaded engagement in said cap opening extending into the hollow center of said helical spring, said second bolt being positioned beneath said bolt head of said first bolt of said upper curb, whereby upon the threadable adjustment of said U-shaped nut down along said bolt into a position next to said bolt head causing the unbolting of said upper curb from said lower curb and the downward threaded movement of said cap causing the loading of said compressible spring and in turn causing ascending movement in said lifting device, there is ascending movement in said upper curb relative to said lower curb to thereby allow for vibratory movement of said upper curb relative to said lower curb to the extent permitted by said compressible spring of said lifting device.

2. An improved pre-assembled vibration absorption system for a rooftop mounted air handling unit or the like, comprising, in combination, plural lower curbs each having a laterally extending panel adjacent an upper end thereof and edges in said panel cooperating to bound openings of a selective size at spaced locations therealong, a cooperating upper curb for each said lower curb disposed in supporting relation thereon, each said upper curb having a threaded first bolt attached to extend in depending relation therefrom through a cooperating one of said lower curb openings and having a bolt head on the lower end thereof, a first operable member threadably disposed on said threaded first bolt for threaded adjustment therealong in the length portion between said bolt head and said lower curb opening, said first operable member being oversized in relation to said lower curb opening so as to be adjustable from a position adjacent said bolt head up along said first bolt into engaged relation with said edges bounding said opening to thereby cause the bolting of said upper and lower curbs together to facilitate the handling thereof during shipment to a rooftop site, and a compressible spring-actuated lifting device comprised of a vertically oriented helical spring, a cap having a threaded opening therein in covering relation over the upper end of said spring, and a second bolt in threaded engagement in said second member opening extending into the hollow center of said helical spring, said second bolt being positioned in lifting relation beneath said bolt head of said first bolt of said upper curb, whereby upon the threaded adjustment of said first operable member down along said first bolt causing the unbolting of said upper curb from said lower curb and the loading of said helical spring incident to said cap being threadably adjusted down along said second bolt there is established contact of said lifting device with said bolt head and a corresponding ascending movement in said upper curb relative to said lower curb to thereby allow for vibratory movement of said upper curb relative to said lower curb to the extent permitted by said helical spring of said lifting device.

3. The improved pre-assembled vibration absorption system as claimed in claim 2, wherein said upper and lower curbs in a superposed relation are disposed in a rectangular shape about a rectangular rooftop opening preparatory to receiving thereon said air handling unit or the like.

4. The improved pre-assembled vibration absorption system as claimed in claim 3, wherein said upper and lower curbs in a superposed relation are disposed in two spaced apart parallel rows preparatory to receiving thereon said air handling unit or the like.

* * * * *